(12) United States Patent
Hunsinger et al.

(10) Patent No.: US 9,751,771 B2
(45) Date of Patent: Sep. 5, 2017

(54) METHOD FOR PRODUCING DICALCIUM SILICATE

(71) Applicant: KARLSRUHER INSTITUT FUER TECHNOLOGIE, Karlsruhe (DE)

(72) Inventors: Hans Hunsinger, Weingarten (DE); Guenter Beuchle, Karlsruhe (DE); Peter Stemmermann, Karlsruhe (DE); Uwe Schweike, Karlsruhe (DE); Karolina Giziewicz, Berlin (DE); Krassimir Garbev, Eggenstein-Leopoldshafen (DE)

(73) Assignee: KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 128 days.

(21) Appl. No.: 14/418,445

(22) PCT Filed: Jul. 24, 2013

(86) PCT No.: PCT/EP2013/002186
§ 371 (c)(1),
(2) Date: Jan. 30, 2015

(87) PCT Pub. No.: WO2014/019656
PCT Pub. Date: Feb. 6, 2014

(65) Prior Publication Data
US 2015/0158733 A1 Jun. 11, 2015

(30) Foreign Application Priority Data
Aug. 1, 2012 (DE) .................. 10 2012 107 022

(51) Int. Cl.
*C01B 33/24* (2006.01)
*C04B 7/345* (2006.01)

(52) U.S. Cl.
CPC ............ *C01B 33/24* (2013.01); *C04B 7/3453* (2013.01); *Y02P 40/148* (2015.11); *Y02P 40/18* (2015.11)

(58) Field of Classification Search
CPC ........ C01B 33/24; C04B 7/3453; Y01P 4/148
See application file for complete search history.

(56) References Cited

U.S. PATENT DOCUMENTS 4,560,413 A * 12/1985 Takagi .................. C04B 7/3453
106/695

FOREIGN PATENT DOCUMENTS

DE          34 14 196 A1      10/1985
DE    10 2009 018 632 A1       9/2011

OTHER PUBLICATIONS

L. Kacimi et al.: "Synthesis of belite cement clinker of high hydraulic reactivity", Cement and Concrete Research, vol. 39, pp. 559-565 (2009).
F. Zeman et al.: "The Reduced Emission Oxygen Kiln. A White Paper Report for the Cement Sustainability Initiative of the World Business Council on Sustainable Development", The Earth Institute at Columbia University, pp. 1-72 (2008).
F. Zeman: "Oxygen combustion in cement production", Energy Procedia, vol. 1, pp. 187-194 (2009).
M. Georgescu: "Active belitic clinkers and cements with high silica modulus", Chemical Abstracts, vol. 112, No. 8, Abstract No. 61702h, p. 360 (1990).
W. Kurdowski et al.: "Transitory phases in the synthesis of dicalcium silicate in the presence of calcium chloride", Chemical Abstracts, vol. 97, Abstract No. 149596j, p. 1 (1984).

* cited by examiner

*Primary Examiner* — Matthew E Hoban
*Assistant Examiner* — James Fiorito
(74) *Attorney, Agent, or Firm* — Norman B. Thot

(57) ABSTRACT

A process for preparing dicalcium silicate includes providing a starting material comprising calcium carbonate ($CaCO_3$) and silicon dioxide ($SiO_2$), wherein a molar ratio of calcium:silicon (C:S) is from 1.5:1 to 2.5:1. At least one of an inorganic alkali metal salt and an alkaline earth metal salt is added as a mineralizing agent to the starting material in an amount of from 0.5 wt.-% to 20 wt.-%, based on a total weight of the starting material. The starting material is reacted with the mineralizing agent in a gas atmosphere having a $CO_2$ partial pressure of from 0.05 MPa to 0.2 MPa at a temperature of from 900° C. to 1100° C. so as to obtain a dicalcium silicate product. The dicalcium silicate product comprises a content of an unreacted starting material of <5 wt.-% and a total carbon content of <1.5 wt.-%, each based on a weight of the dicalcium silicate product.

11 Claims, 12 Drawing Sheets

METHOD FOR PRODUCING DICALCIUM SILICATE

CROSS REFERENCE TO PRIOR APPLICATIONS

This application is a U.S. National Phase application under 35 U.S.C. §371 of International Application No. PCT/EP2013/002186, filed on Jul. 24, 2013 and which claims benefit to German Patent Application No. 10 2012 107 022.9, filed on Aug. 1, 2012. The International Application was published in German on Feb. 6, 2014 as WO 2014/019656 A1 under PCT Article 21(2).

FIELD

The present invention relates to a process for preparing dicalcium silicate, for example, $\alpha'_L$-, $\beta$-$C_2S$ and amorphous dicalcium silicate, to be used as a hydraulic binder or as a starting material for producing a hydraulic binder. Dicalcium silicate in the $\gamma$-$C_2S$ form is unsuitable.

BACKGROUND

The conventional cement notation in which C represents CaO, S represents $SiO_2$, A represents $Al_2O_3$ and H represents $H_2O$ is used in the present document. In this notation, the $\beta$-dicalcium silicate belite is, for example, represented by $\beta$-$C_2S$ since the molar ratio of calcium:silicon (Ca:Si) therein has a value of 2:1, which corresponds to 2[CaO]·[$SiO_2$]=$Ca_2SiO_4$ in conventional notation.

Belite cements containing dicalcium silicate are known from cement technology and are produced by the conventional process for cement clinker production, however, the production thereof is similarly energy-consuming as the production of portland cement. For this purpose, the raw materials lime and silicon dioxide are milled and mixed in a molar ratio of Ca:Si of about 2. The product is subsequently firstly deacidified at about 800° C. and subsequently fired at about 1250° C. in a rotary tube furnace. The belite clinker formed is milled together with milling additives after cooling.

DE 10 2005 037 771 B4 describes that the deacidified starting materials are milled and blended so as to provide a mixture having a molar ratio of C:S in the range from 1.5:1 to 2.5:1. Any CaO deficit must thereby be compensated by adding quicklime or lime milk. Sealing of the starting material with crystallization nuclei composed of $\alpha'_L$-$Ca_2$[$HSiO_4$](OH) and subsequent hydrothermal treatment at about 200° C. gives an intermediate containing $\alpha$-$Ca_2SiO_4$(OH)$_2$. After filtration and drying, this intermediate is converted at firing temperatures of from 600° C. to 900° C. into a belite-containing binder and subsequently milled. A disadvantage here is the need for two thermal treatment stages, i.e., a hydrothermal stage and a firing. The product produced by this process is similarly sluggish to react as the material produced in a rotary tube furnace.

DE 10 2009 018 632 B4 describes a starting material containing calcium (Ca), silicon (Si), and oxygen atoms, where 0-50% of the silicon atoms have been replaced by aluminum (Al) atoms, which are present in a molar ratio of C:(S+A), in the determination of which the modal proportions of lime, calcium sulphite and calcium sulphate remain disregarded, of from 1.5:1 to 2.5:1, is firstly produced and admixed with water. The starting material which has been admixed with water in this way is then hydrothermally treated at a temperature of 120-250° C., as a result of which the starting material is converted predominantly into an intermediate. A subsequent reaction milling of the intermediate at a temperature of 100-150° C. in pure form or together with other silicate-containing materials in a mill results in reaction and dewatering to give at least partly the belite-containing binder. A disadvantage here is that calcium carbonate cannot be used directly in this process.

SUMMARY

An aspect of the present invention is to provide a process for preparing dicalcium silicate which does not have the abovementioned disadvantages and restrictions. An aspect of the present invention is in particular to provide a process which allows for an energy-efficient preparation of dicalcium silicate from starting materials customary in the building industry.

In an embodiment, the present invention provides a process for preparing dicalcium silicate which includes providing a starting material comprising calcium carbonate ($CaCO_3$) and silicon dioxide ($SiO_2$), wherein a molar ratio of calcium:silicon (C:S) is from 1.5:1 to 2.5:1. At least one of an inorganic alkali metal salt and an alkaline earth metal salt is added as a mineralizing agent to the starting material in an amount of from 0.5 wt.-% to 20 wt.-%, based on a total weight of the starting material. The starting material is reacted with the mineralizing agent in a gas atmosphere having a $CO_2$ partial pressure of from 0.05 MPa to 0.2 MPa at a temperature of from 900° C. to 1100° C. so as to obtain a dicalcium silicate product. The dicalcium silicate product comprises a content of an unreacted starting material of <5 wt.-% and a total carbon content of <1.5 wt.-%, each based on a weight of the dicalcium silicate product.

BRIEF DESCRIPTION OF THE DRAWINGS

The present invention is described in greater detail below on the basis of embodiments and of the drawings in which.

DETAILED DESCRIPTION

Figure 1:
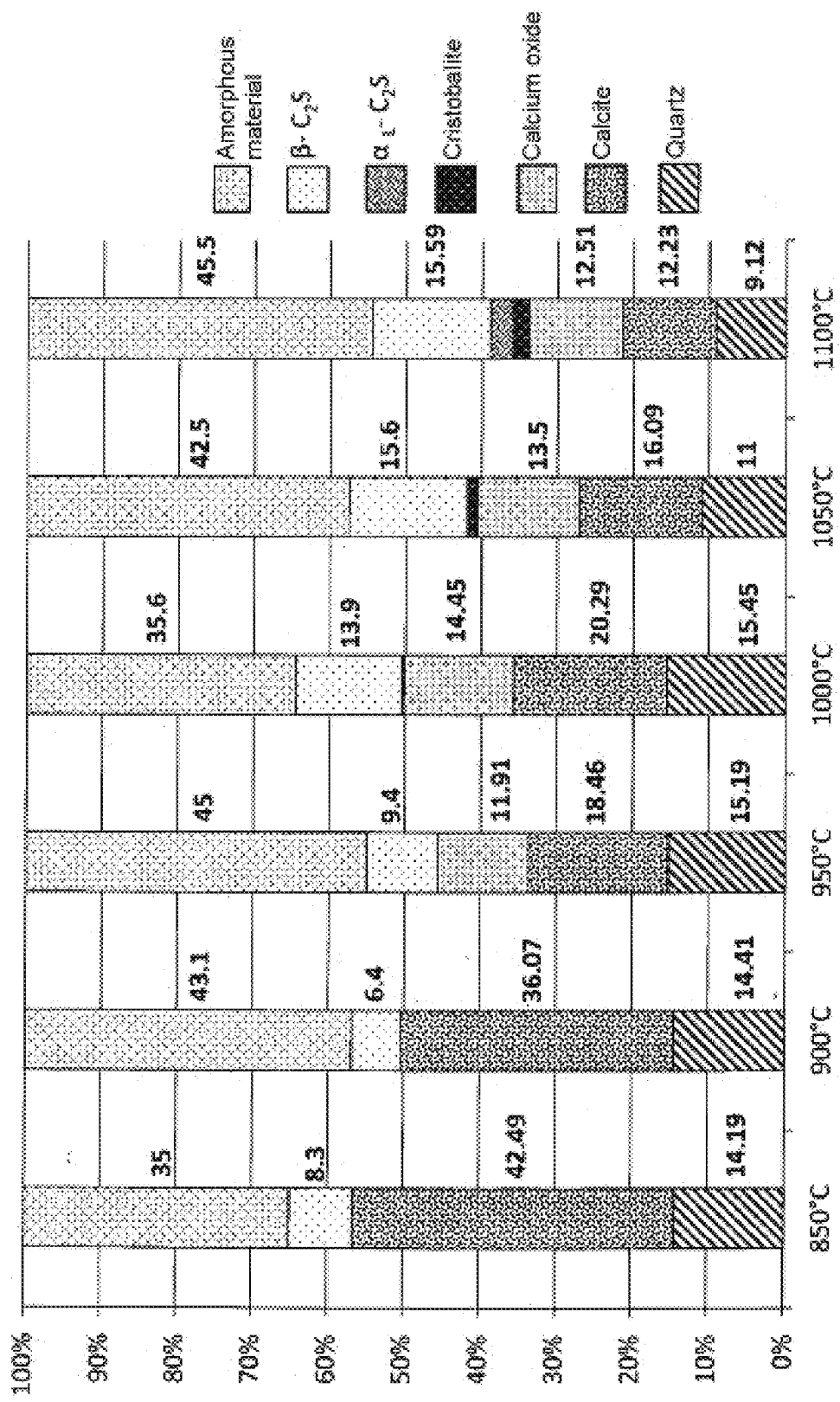
FIG. 1 shows the reaction of the starting materials without a mineralizing agent (Comparative Example)

In an embodiment of the present invention, the energy-efficient production of dicalcium silicate from starting materials containing calcium carbonate CaCO₃ and silicon dioxide SiO₂ can, for example, occur at a molar ratio of C:S of 2:1 according to the equation (1):

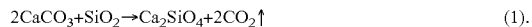

$$2CaCO_3 + SiO_2 \rightarrow Ca_2SiO_4 + 2CO_2 \uparrow \qquad (1).$$

The reaction enthalpy in this reaction is ΔH=115 kJ/mol of Ca and thus about 35% lower than the pure thermal decomposition of calcium carbonate CaCO₃ without addition of SiO₂ according to the equation (2):

$$CaCO_3 \rightarrow CaO + CO_2 \uparrow \qquad (2)$$

which has a reaction enthalpy of ΔH=178 kJ/mol of Ca.

To convert starting materials containing CaCO₃ and SiO₂ in a molar ratio of C:S of from 1.5:1 to 2.5:1, for example, from 1.9:1 to 2.1:1, for example, 2:1, very completely into dicalcium silicate, it is necessary to add a mineralizing agent in the form of an inorganic alkali metal salt or an alkaline earth metal salt, for example, a carbonate, a hydrogencarbonate, a fluoride, a chloride, or a mixture thereof, for example, sodium carbonate Na₂CO₃,
sodium fluoride NaF,
potassium fluoride KF,
calcium fluoride CaF₂,
magnesium chloride MgCl₂, or
a mixture thereof, in an amount of from 0.5 wt.-% to 20 wt.-% inclusive, for example, from 2 wt.-% to 10 wt.-% inclusive, in each case based on the sum of the starting materials.

In an embodiment of the present invention, in particular for the selective preparation of $\alpha'_L$-, $\beta$-C₂S and amorphous dicalcium silicate, the starting materials can, for example, be initially charged in a molar ratio of C:S of from 1.9 to 2.1. As the mineralizing agent, from 0.5 to 10 wt.-% inclusive of Na₂CO₃, or
a mixture of from 0.5 to 5 wt.-% inclusive of Na₂CO₃ and from 0.5 to 5 wt.-% inclusive of CaF₂, in each case based on the sum of the starting materials, can be added.

In an embodiment of the present invention which gives the highest yield of $\alpha'_L$- and/or $\beta$-C₂S combined with low costs, a mixture of from 0.5 to 1.5 wt.-% inclusive of Na₂CO₃ and from 0.5 to 1.5 wt.-% inclusive of CaF₂ can, for example, be used as the mineralizing agent.

In an embodiment of the present invention which gives the highest observed yield of $\alpha'_L$-C₂S, a mixture of from 4 to 6 wt.-% inclusive of Na₂CO₃ without addition of CaF₂ can, for example, be used as the mineralizing agent.

The process of the present invention is carried out:
in a gas atmosphere having a CO₂ partial pressure $p_{CO2}$ of from 0.05 to 0.2 MPa, for example, from 0.08 to 0.12 MPa, and
at temperatures of from 900 to 1100° C., for example, from 950 to 1050° C.,
for example, for a time of from 10 minutes to 5 hours, for example, in a range from 30 minutes to 1 hour.

Pure CO₂ is liberated in the calcination reaction of calcium carbonate (see equation 1). In the case of external reactor heating or integrated oxy-fuel combustion of carbon-containing fuels, the CO₂ partial pressure $p_{CO2}$ corresponds approximately to the total pressure $p_{tot}$. In the case of integrated oxy-fuel combustion of fuels containing C and H, the CO₂ partial pressure $p_{CO2}$ corresponds approximately to the total pressure $p_{tot}$ of the dry gas. The CO₂ both from the raw material and also from the fuel can then, optionally after drying, be utilized directly together or alternatively be disposed of by underground storage (analogous to carbon dioxide capture and storage, CCS).

In an embodiment of the present invention, the process can, for example, be carried out so that at least part of the mineralization agents containing alkalis, in particular Na₂CO₃, can be recovered from the process product and used again.

For this purpose, the dicalcium silicate-containing product obtained in the present process can, for example, be suspended in water, for example, at a temperature up to 250° C., so that alkali metal-containing compounds present therein are decomposed and dissolved predominantly as alkali metal hydroxides in order to then react with introduced carbon dioxide CO₂ to form carbonates and/or hydrogencarbonates, e.g., Na₂CO₃ and/or NaHCO₃. After the carbonates and/or hydrogencarbonates have been separated off, they are recirculated as mineralizing agent to the process.

The product prepared by the process of the present invention then displays a particularly high quality as long as it has a content of unreacted starting material of less than 5 wt.-% and a total carbon content below 1.5 wt.-%, in each case based on the sum of the process products. The total carbon content is defined as the proportion by weight of carbon in the total process product, including the material present in amorphous form in the product. The content of γ-C₂S should be below 5 wt.-%.

The process of the present invention includes the following advantages.

The process of the present invention allows for the energy-efficient preparation of dicalcium silicate, in particular having a molar ratio of Ca:Si very close to 2:1, from starting materials customary in the building industry which contain calcium carbonate CaCO₃ and silicon dioxide SiO₂. The yield of $\alpha'_L$- and $\beta$-C₂S in the process product can be adjusted by selection of the process parameters CO₂ partial pressure and temperature and also the mineralizing agent.

The dicalcium silicate obtained by this process is particularly suitable as a starting material for the process described in DE 10 2009 018 632 B4.

The present invention is illustrated below with the aid of illustrative Examples and the Figures.

In all experiments, the natural raw materials:
limestone as the source of calcium carbonate CaCO₃; and
quartz flour as the primary source of silicon dioxide SiO₂;
were used as starting materials. Said natural raw materials additionally have further constituents, e.g., Mg.

The following composition was determined by means of X-ray fluorescence analysis for the quartz flour used:

| Oxide | Wt.-% |
| --- | --- |
| Al₂O₃ | 0.052 |
| CaO | 0.017 |
| K₂O | 0.112 |
| Na₂O | 0.008 |
| SiO₂ | 97.74 |

The following composition was determined by means of X-ray fluorescence analysis for the limestone used:

| Oxide | Wt.-% |
|---|---|
| $CO_2$ | 42.8 |
| $Na_2O$ | 0.02 |
| MgO | 0.48 |
| $Al_2O_3$ | 0.70 |
| $SiO_2$ | 1.84 |
| $P_2O_5$ | 0.37 |
| $SO_2$ | 0.07 |
| $K_2O$ | 0.18 |
| CaO | 53.1 |
| $TiO_2$ | 0.04 |
| $Fe_2O_3$ | 0.34 |
| SrO | 0.03 |

COMPARATIVE EXAMPLE

Without a Mineralizing Agent

For comparison, the starting materials were reacted at a molar ratio of C:S=2 at a $CO_2$ partial pressure ($p_{CO2}$) of 0.1 MPa for 2 hours at temperatures of 850-1100° C. without the addition of a mineralizing agent.

As shown in FIG. 1, in this comparative example, a yield of $\alpha'_L$-$C_2S$ of 2.95 wt.-% could be detected only at 1100° C., while the yield of $\beta$-$C_2S$ rose from 6.40 wt.-% to 15.59 wt.-% with rising temperature over the entire temperature range. Considerable amounts of unreacted quartz, CaO and $CaCO_3$ were present in the process product. The total carbon content was above 1.5 wt.-%.

Example 1

Variation of the $CO_2$ Partial Pressure using 5 wt.-% $Na_2CO_3$ as the Mineralizing Agent In a first example, the starting materials were reacted at C:S=2 at a $CO_2$ partial pressure of 0.0065-0.25 MPa for 2 hours at a temperature of 1000° C. with addition of 5 wt.-% of the mineralizing agent $Na_2CO_3$, based on the sum of the starting materials.

Figure 2:
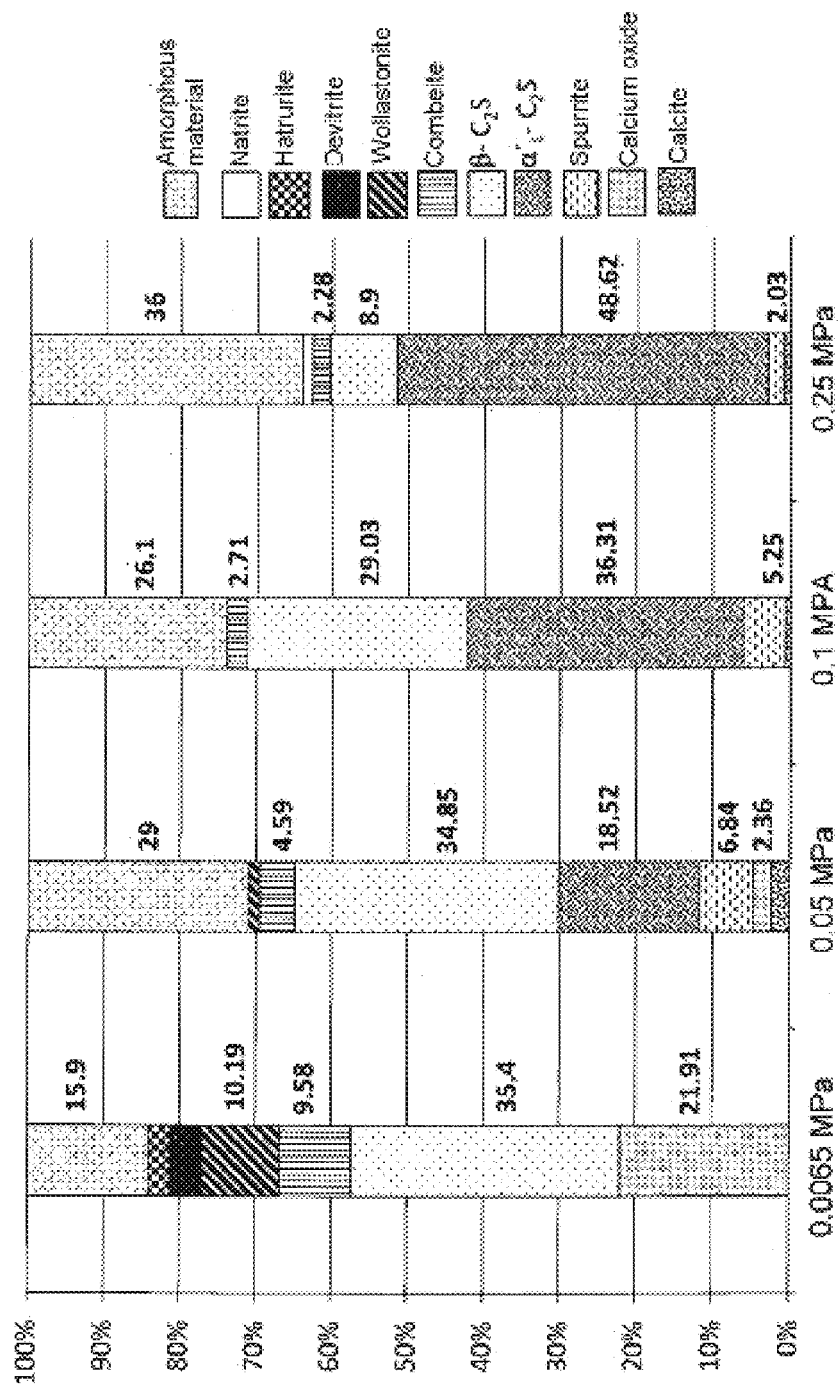
FIG. 2 shows the reaction of the starting materials with the variation of the $CO_2$ partial pressure using 5 wt.-% $Na_2CO_3$ as the mineralizing agent.

As shown in FIG. 2, a yield of $\beta$-$C_2S$ of 35.40 wt.-% was obtained even at a low $p_{CO2}$=0.0065 MPa and, with increasing pressure, this decreased to 29.03 wt.-% at $P_{CO2}$=0.1 MPa and to 8.90 wt.-% at $p_{CO2}$=0.25 MPa.

As also shown in FIG. 2, no yield of $\alpha'_L$-$C_2S$ could be detected at a low $p_{CO2}$ of only 0.0065 MPa. Only at $p_{CO2}$=0.05 MPa were 18.52 wt.-% of $\alpha'_L$-$C_2S$ observed; the value increased to 36.31 wt.-% at $p_{CO2}$=0.1 MPa and even to 48.62 wt.-% at $p_{CO2}$=0.25 MPa.

As is finally shown in FIG. 2, the highest total yield of $\alpha'_L$- and $\beta$-$C_2S$ of 65.34 wt.-% was obtained with the addition of 5 wt.-% of the mineralizing agent $Na_2CO_3$ at 1000° C. and $p_{CO2}$=0.1 MPa.

Example 2

Variation of the Molar Ratio of C:S Using 5 wt.-% of $Na_2CO_3$ as the Mineralizing Agent In a second example, the starting materials were reacted at the molar ratios C:S=1, C:S=2 and C:S=3, in each case at $p_{CO2}$=0.1 MPa for 2 hours at a temperature of 1000° C. with addition of 5 wt.-% of the mineralizing agent $Na_2CO_3$, based on the sum of the starting materials.

Figure 3:
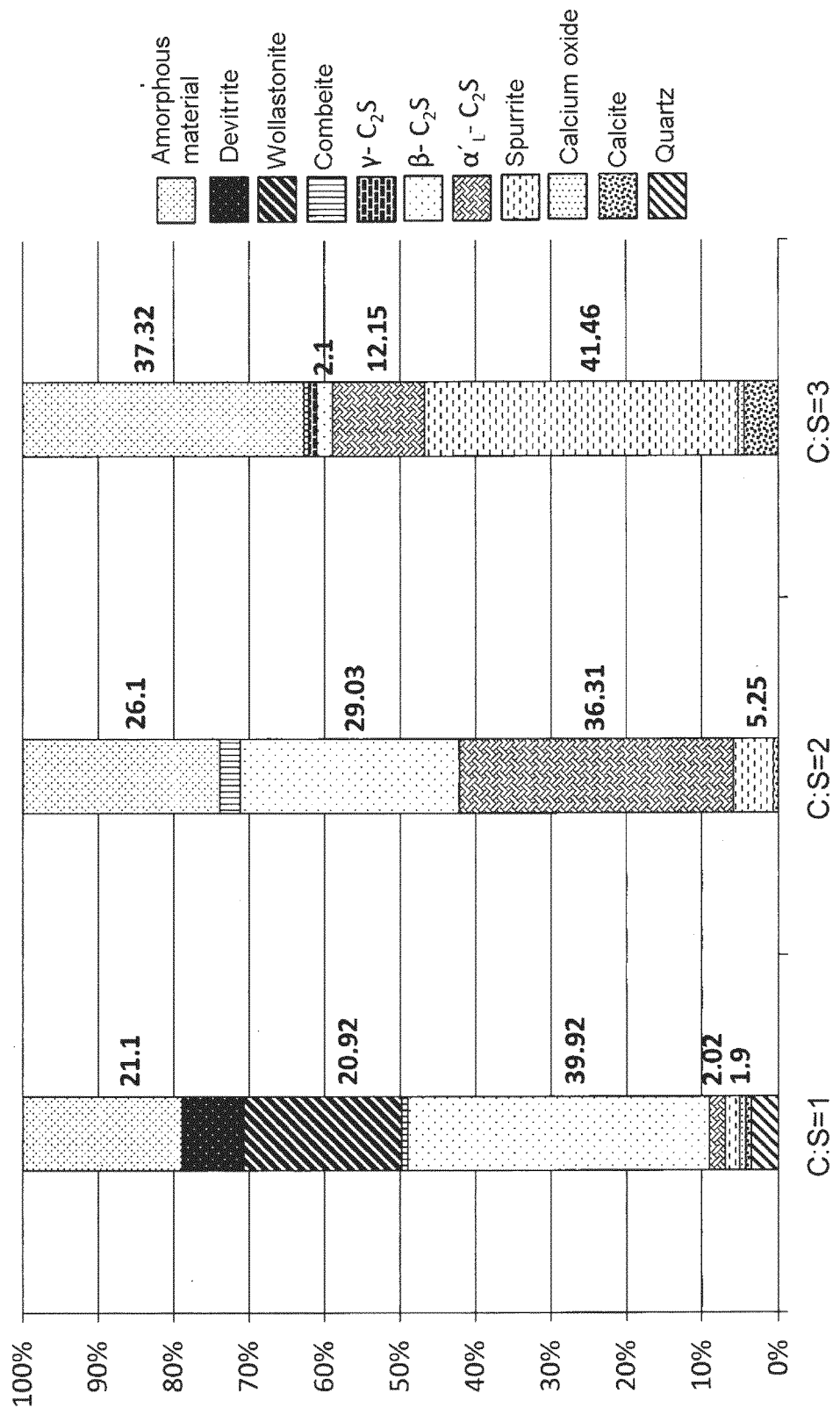
FIG. 3 shows the reaction of the starting materials with the variation of the molar ratio of C:S using 5 wt.-% $Na_2CO_3$ as the mineralizing agent.

As shown in FIG. 3, the highest yield both of $\alpha'_L$-$C_2S$ and of $\beta$-$C_2S$ and thus also the highest total yield were obtained at C:S=2.

Example 3

Variation of the Content of $Na_2CO_3$ as the Mineralizing Agent

In a third example, the starting materials were reacted at C:S=2 and $p_{CO2}$=0.1 MPa for 2 hours at a temperature of 1000° C. with the addition of the mineralizing agent $Na_2CO_3$, with the proportion of $Na_2CO_3$, based on the sum of the starting materials, being varied from 1 wt.-% to 10 wt.-%.

Figure 4:
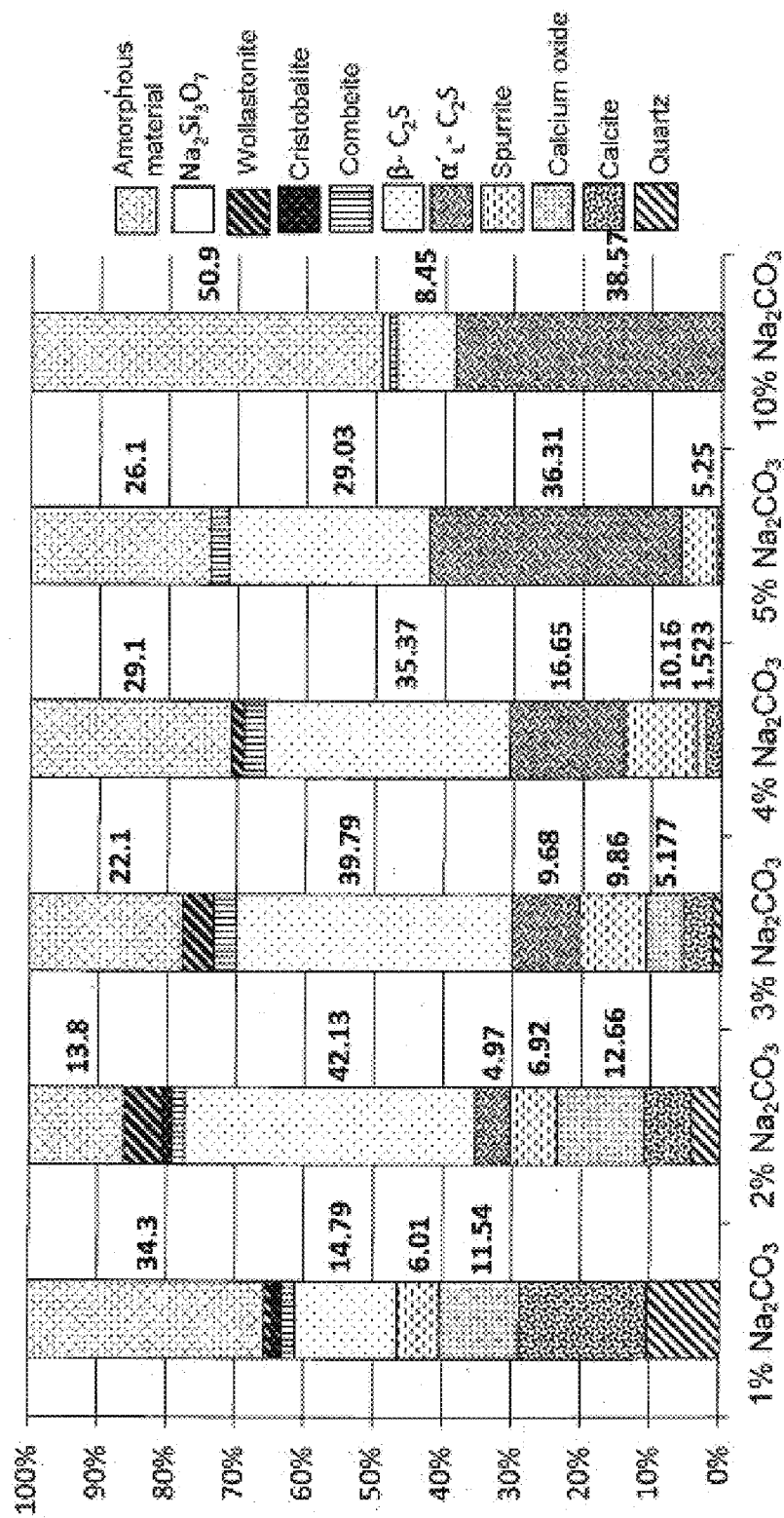
FIG. 4 shows the reaction of the starting materials with the variation of the content of $Na_2CO_3$ as the mineralizing agent.

As shown in FIG. 4, the highest yield both of $\alpha'_L$-$C_2S$ and of $\beta$-$C_2S$ and thus also the highest total yield of 65.34 wt.-% were obtained at a proportion of 5 wt.-% of the mineralizing agent $Na_2CO_3$.

Example 4

Variation of the Temperature using 5 wt.-% of $Na_2CO_3$ as the Mineralizing Agent In a fourth example, the starting materials were reacted at C:S=2 and $p_{CO2}$=0.1 MPa for 2 hours, in each case at temperatures of 850-1100° C., with the addition of 5 wt.-% of the mineralizing agent $Na_2CO_3$, based on the sum of the starting materials.

Figure 5:
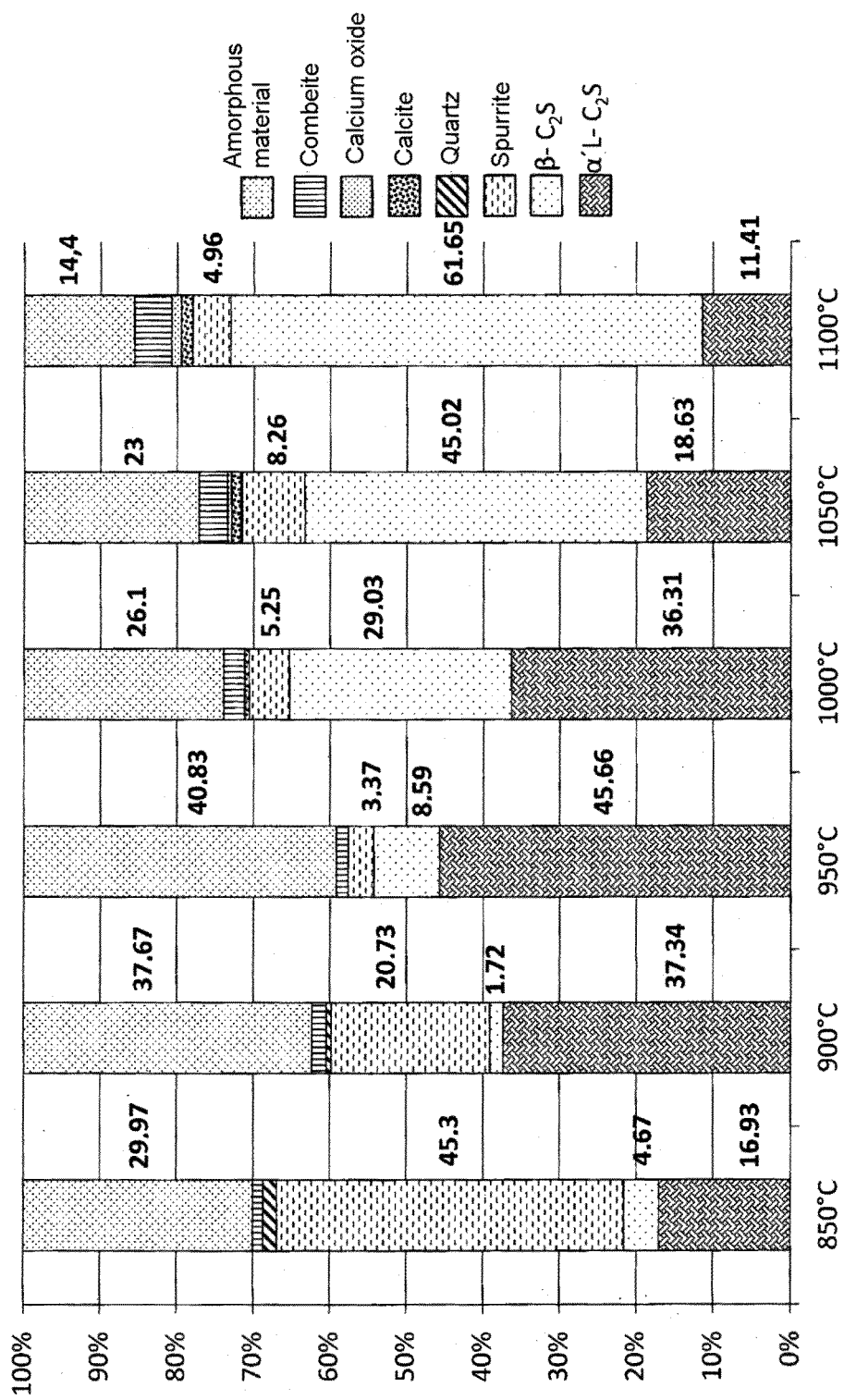
FIG. 5 shows the reaction of the starting materials with the variation of the temperature using 5 wt.-% $Na_2CO_3$ as the mineralizing agent.

As shown in FIG. 5, high total yields as the sum of the yields of $\alpha'_L$- and $\beta$-$C_2S$ of 54.25-65.34 wt.-% were obtained in the range from 950° C. to 1050° C., with a total yield of 65.34 wt.-% at 1000° C. being determined as optimum. At this temperature, the chemical and thermal stress on the reactor material and the energy consumption is also reduced compared to higher temperatures.

As FIG. 5 likewise shows, although the total yield of $\alpha'_L$- and $\beta$-$C_2S$ increases again at 1100° C., this is associated with a higher chemical and thermal stress on the reactor material and a higher energy consumption.

Figure 6:
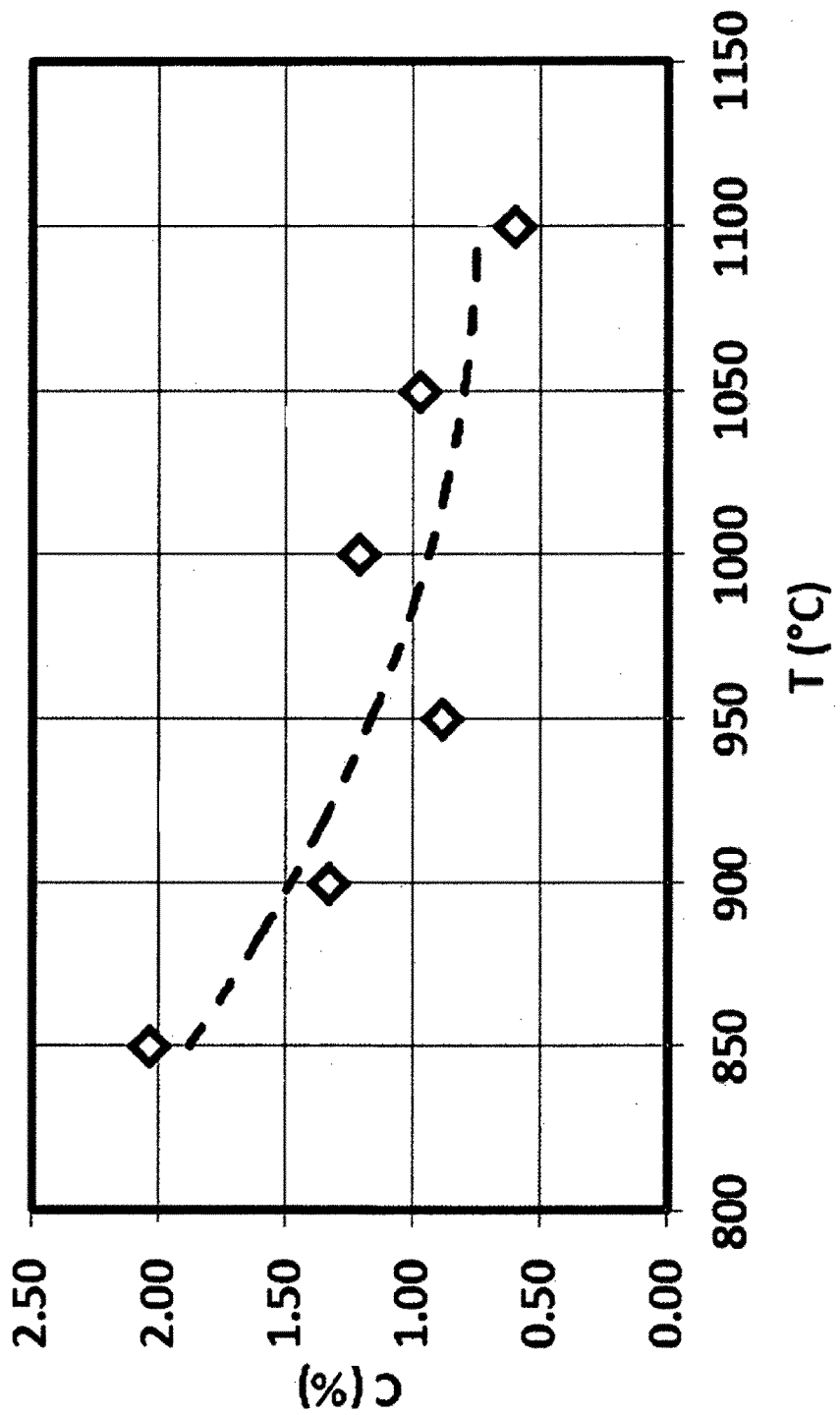
FIG. 6 shows the total carbon content with the variation of the temperature using 5 wt.-% $Na_2CO_3$ as the mineralizing agent.

As can be seen from FIG. 6, the total carbon content is in the desired target range of below 1.5 wt.-% in the temperature range of 900-1100° C., based on the sum of the reaction products, while at 850° C., it is 2 wt.-%, which is still above the preferred target range.

Example 5

Variation of the Temperature Using 2 wt.-% of KF as the Mineralizing Agent

In a fifth example, the starting materials were reacted at C:S=2 and $p_{CO2}$=0.1 MPa for 2 hours, in each case at temperatures of 850-1100° C., with the addition of 2 wt.-% of the mineralizing agent KF, based on the sum of the starting materials.

Figure 7:
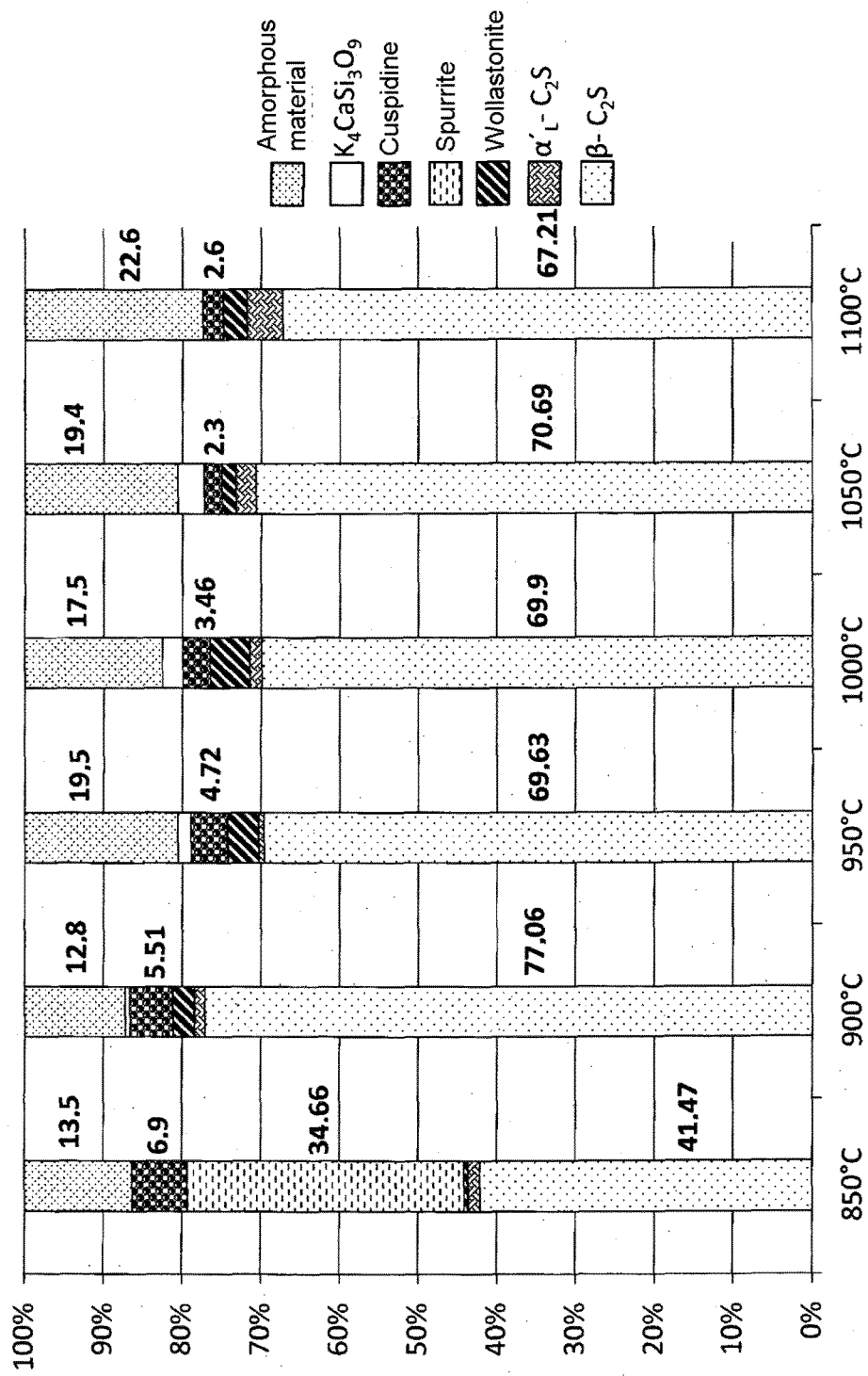
FIG. 7 shows the reaction of the starting materials with the variation of the temperature using 2 wt.-% KF as the mineralizing agent.

As shown in FIG. 7, high yields of $\beta$-$C_2S$ of up to 76.83 wt.-% were obtained in the range from 900° C. to 1100° C., while the yield of $\alpha'_L$-$C_2S$ was below 5 wt.-%.

Example 6

Variation of the Content of KF as the Mineralizing Agent

In a sixth example, the starting materials were reacted at C:S=2 and $p_{CO2}$=0.1 MPa for 2 hours at a temperature of 900° C. with the addition of the mineralizing agent KF, with the proportion of KF, based on the sum of the starting materials, being varied from 0.5 wt.-% to 5 wt.-%.

Figure 8:
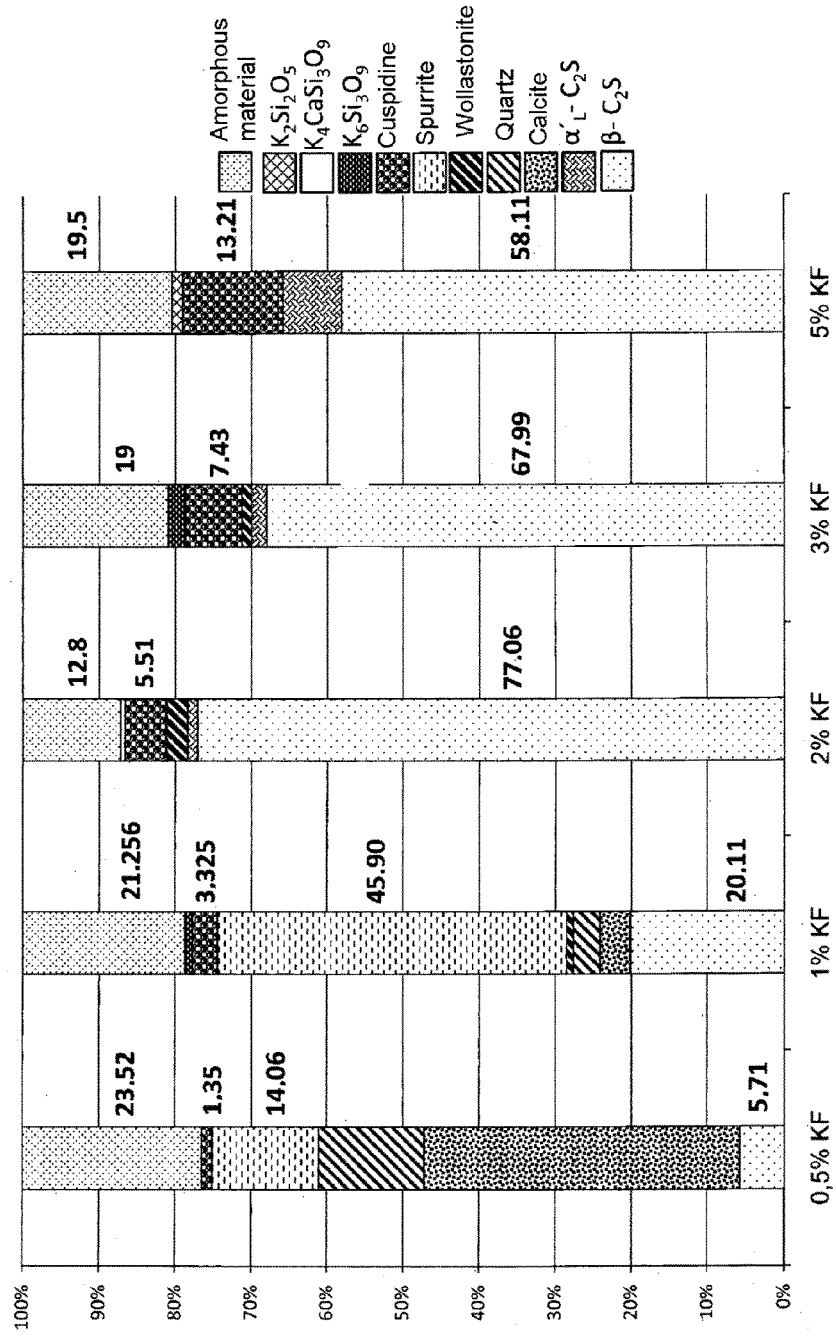
FIG. 8 shows the reaction of the starting materials with the variation of the content of KF as the mineralizing agent.

As shown in FIG. 8, the highest yield of β-$C_2S$ of 76.83 wt.-% was obtained at a proportion of 2 wt.-% of the mineralizing agent KF.

Example 7

Variation of the Temperature Using 2 wt.-% of NaF as the Mineralizing Agent

In a seventh example, the starting materials were reacted at C:S=2 and $p_{CO2}$=0.1 MPa for 2 hours, in each case at temperatures of 850-1100° C., with the addition of 2 wt.-% of the mineralizing agent NaF, based on the sum of the starting materials.

Figure 9:
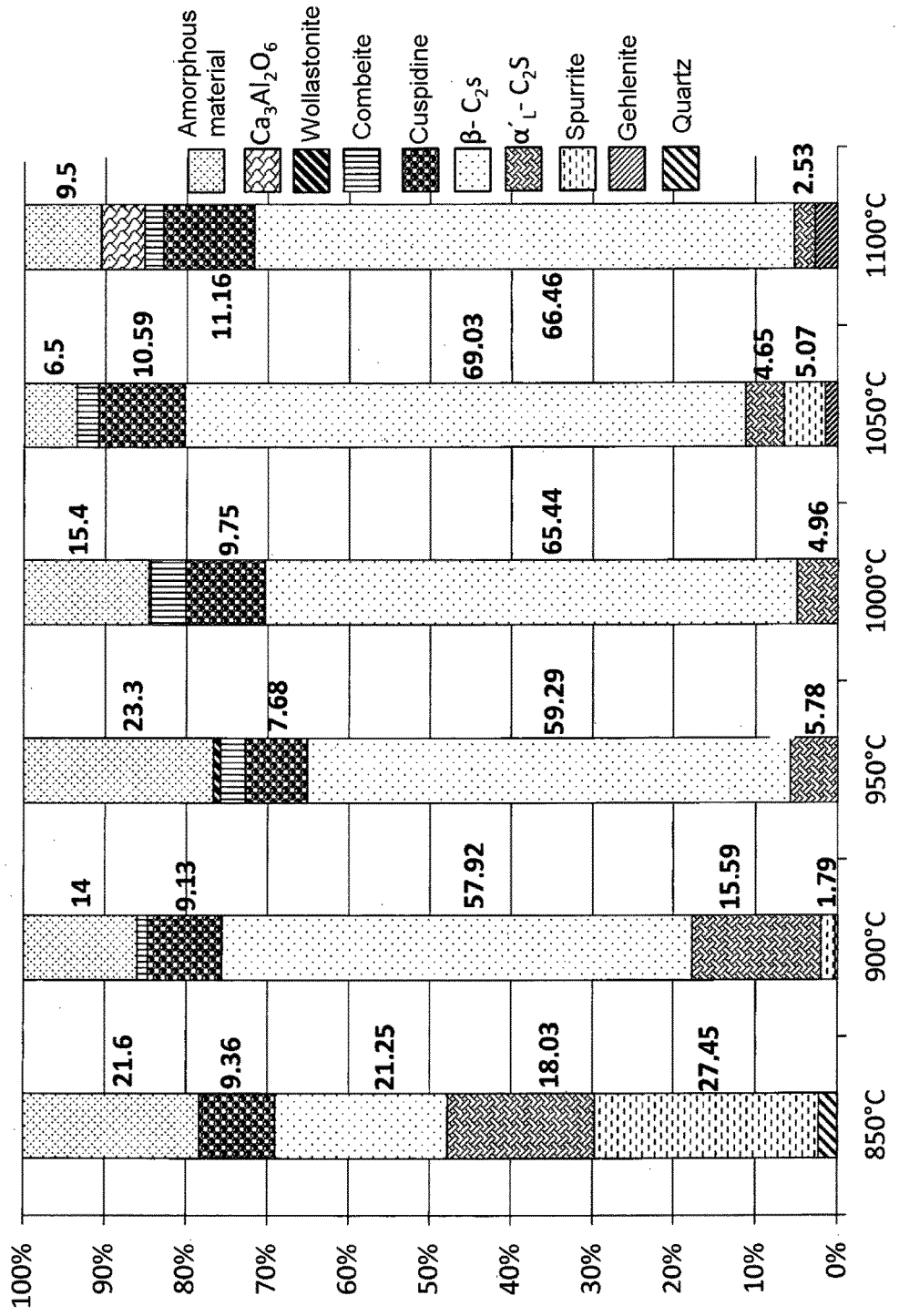
FIG. 9 shows the reaction of the starting materials with the variation of the temperature using 2 wt.-% NaF as the mineralizing agent.

As shown in FIG. 9, high yields of β-$C_2S$ of up to 69.03 wt.-% were obtained in the range from 900° C. to 1100° C., while the yield of α'$_L$-$C_2S$ was far lower.

Example 8

Variation of the Content of $CaF_2$ as the Mineralizing Agent

In an eighth example, the starting materials were reacted at C:S=2 and $p_{CO2}$=0.1 MPa for 2 hours at a temperature of 1000° C. with addition of the mineralizing agent $CaF_2$, with the proportion of $CaF_2$, based on the sum of the starting materials, being varied from 1 wt.-% to 5 wt.-%.

Figure 10:
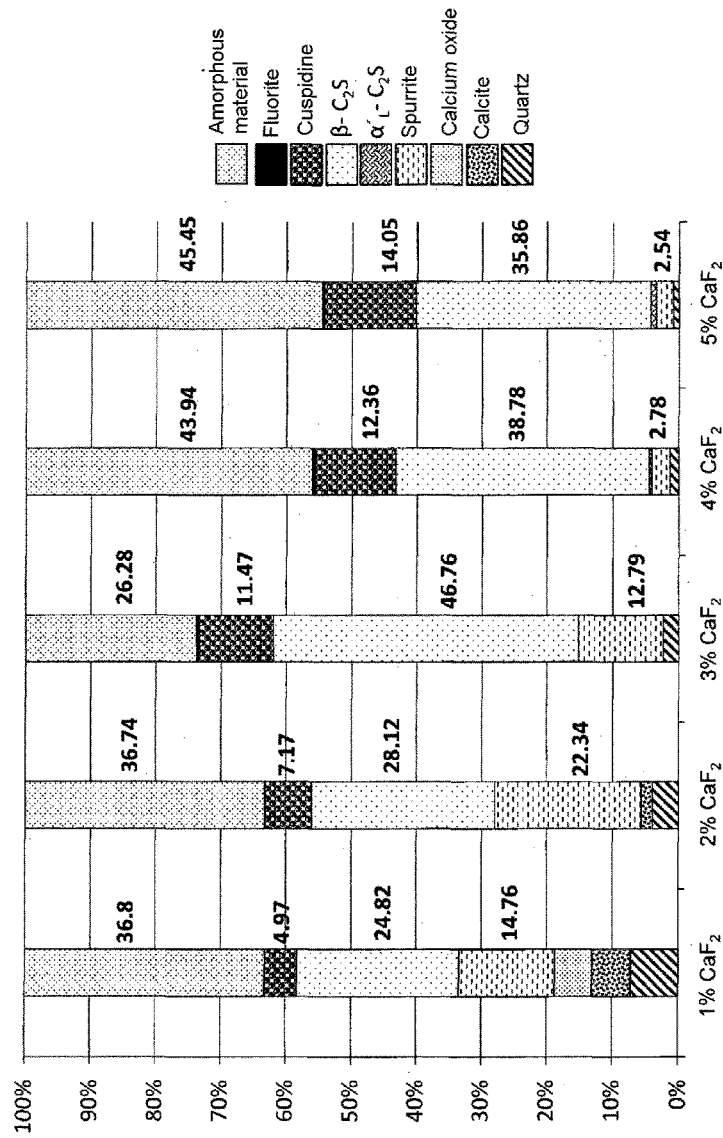
FIG. 10 shows the reaction of the starting materials with the variation of the content of $Ca_2F$ as the mineralizing agent.

As shown in FIG. 10, high yields of β-$C_2S$ were obtained at the proportions of the mineralizing agent $CaF_2$ employed, while the yields of α'$_L$-$C_2S$ were extremely small.

Example 9

Variation of the $CO_2$ Partial Pressure Using a Mixture of 1 wt.-% of $Na_2CO_3$ and 1 wt.-% of $CaF_2$ as the Mineralizing Agent In a ninth example, the starting materials were reacted at C:S=2 and $CO_2$ partial pressures of 0.003 MPa or of 0.1 MPa for 2 hours at a temperature of 1000° C. with addition of a mixture of 1 wt.-% of $Na_2CO_3$ and 1 wt.-% of $CaF_2$ as the mineralizing agent, based on the sum of the starting materials.

Figure 11:
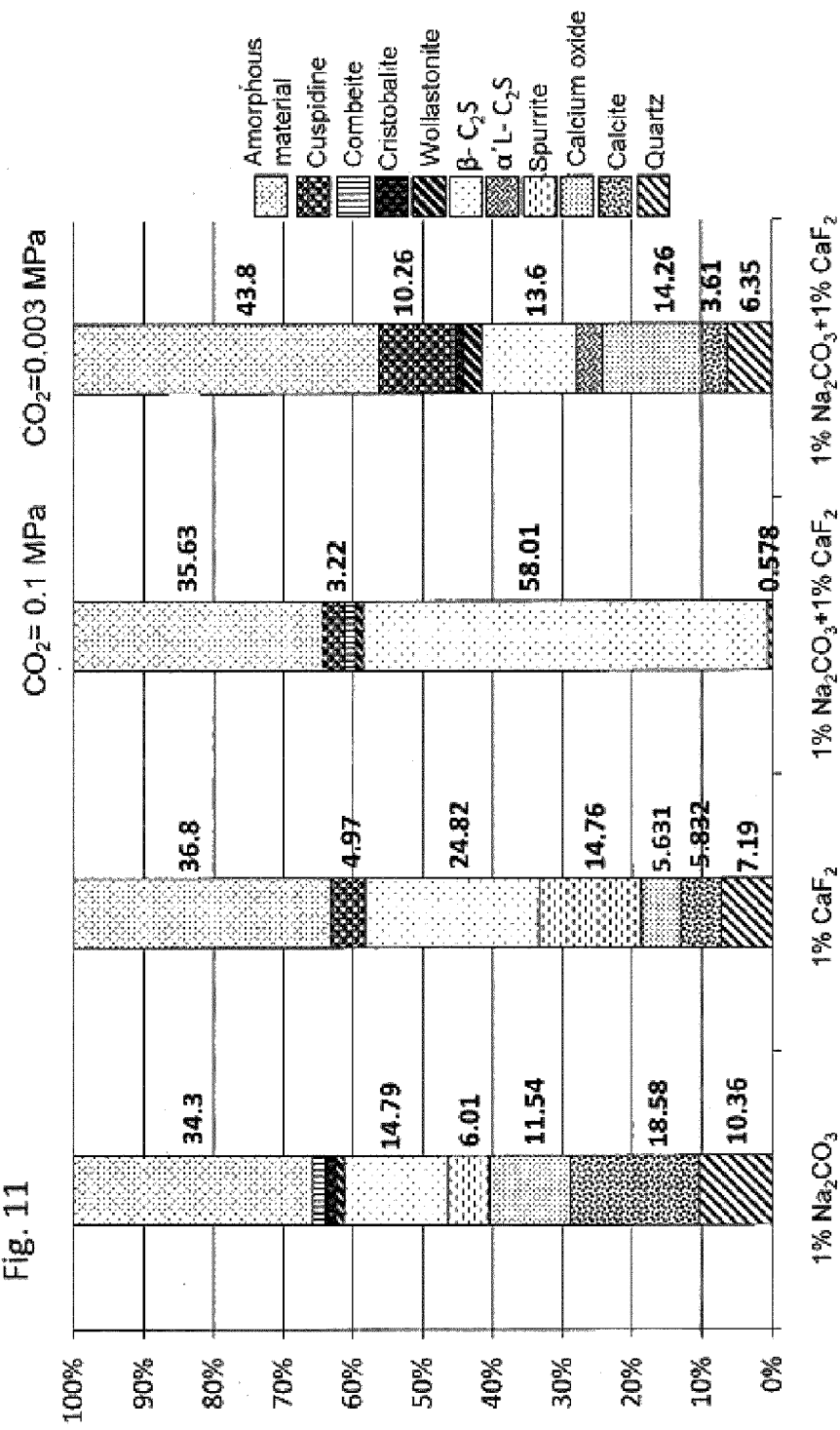
FIG. 11 shows the reaction of the starting materials with the variation of the CO₂ partial pressure using a mixture of 1 wt.-% Na₂CO₃ and 1 wt.-% CaF₂ as the mineralizing agent.

As shown in FIG. 11, a yield of β-$C_2S$ of 13.06 wt.-% was obtained even at a low $p_{CO2}$=0.003 MPa, and this increased significantly to 58.01 wt.-% at $p_{CO2}$=0.1 MPa. Compared to the studies at $p_{CO2}$=0.1 MPa, in which only 1 wt.-% of $Na_2CO_3$ or only 1 wt.-% of $CaF_2$ were used as the mineralizing agent, the use of the mixture of 1 wt.-% of $Na_2CO_3$ and 1 wt.-% of $CaF_2$ as the mineralizing agent led to the highest observed yield of β-$C_2S$.

Example 10

Use of 5 wt.-% of $Na_2CO_3$ as the Mineralizing Agent in Pure Form or in the Form of Material Recovered from the Process Products In a tenth example, the starting materials were reacted at C:S=2 and $p_{CO2}$=0.1 MPa for 2 hours at a temperature of 1000° C. with addition of 5 wt.-% of the mineralizing agent $Na_2CO_3$, based on the sum of the starting materials.

Figure 12:
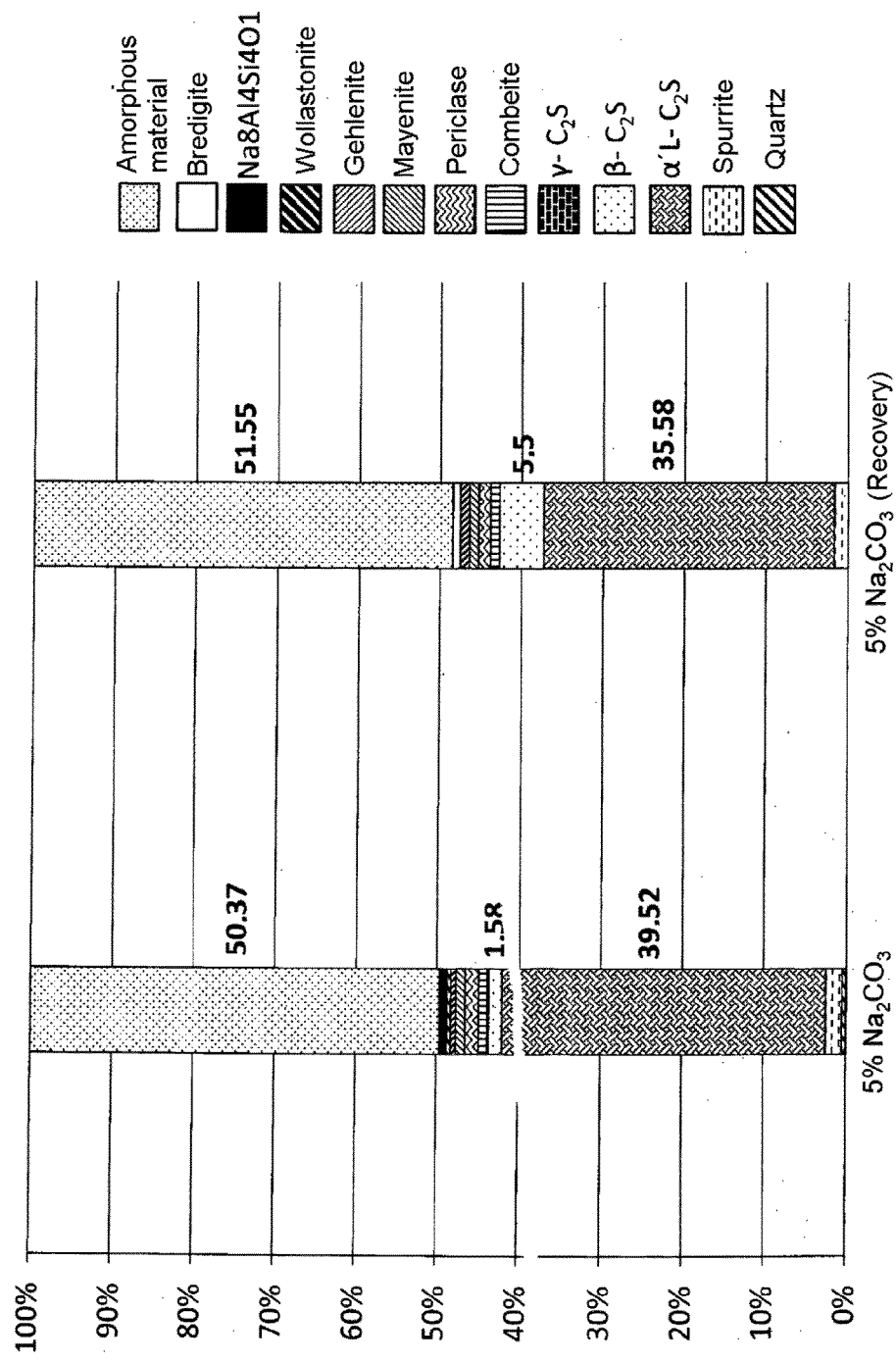
FIG. 12 shows the reaction of the starting materials using pure Na₂CO₃ or Na₂CO₃ recovered from process products as the mineralizing agent.

As shown in FIG. 12, the following differences were obtained depending on whether pure $Na_2CO_3$ or $Na_2CO_3$ recovered from the process products was used. In the latter case, a small proportion of sodium hydrogencarbonate is present and this preferentially leads to formation of β-$C_2S$, while the sum of α'$_L$-$C_2S$ and β-$C_2S$ remains about the same.

The present invention is not limited to embodiments described herein; reference should be had to the appended claims.

What is claimed is:

1. A process for preparing dicalcium silicate, the process comprising:
providing a starting material comprising calcium carbonate ($CaCO_3$) and silicon dioxide ($SiO_2$), wherein a molar ratio of calcium:silicon is from 1.5:1 to 2.5:1;
adding at least one of an inorganic alkali metal salt and an alkaline earth metal salt as a mineralizing agent to the starting material in an amount of from 0.5 wt.-% to 20 wt.-%, based on a total weight of the starting material; and
reacting the starting material with the mineralizing agent in a gas atmosphere having a $CO_2$ partial pressure of from 0.05 MPa to 0.2 MPa at a temperature of from 900° C. to 1100 ° C. so as to obtain a dicalcium silicate product.

2. The process as recited in claim 1, wherein the molar ratio of calcium:silicon of the starting material is from 1.9:1 to 2.1:1.

3. The process as recited in claim 1, wherein the $CO_2$ partial pressure of the gas atmosphere is from 0.08 MPa to 0.12 MPa.

4. The process as recited in claim 1, wherein the starting material is reacted at a temperatures of from 950 ° C. to 1050 ° C.

5. The process as recited in claim 1, wherein the amount of the mineralizing agent added to the starting material is from 1 wt.-% to 10 wt.-%, based on the total weight of the starting material.

6. The process as recited in claim 1, wherein the at least one of an inorganic alkali metal salt and an alkaline earth metal salt as the mineralizing agent is provided as a carbonate, a hydrogencarbonate, a fluoride, a chloride, or a mixture thereof.

7. The process as recited in claim 1, wherein the at least one of an inorganic alkali metal salt and an alkaline earth metal salt as the mineralizing agent is selected from at least one of sodium carbonate ($Na_2CO_3$), sodium fluoride (NaF), potassium fluoride (KF), calcium fluoride ($CaF_2$), and magnesium chloride ($MgCl_2$).

8. The process as recited in claim 1, wherein the mineralizing agent is provided as a mixture of from 0.5 wt.-% to 5 wt.-% $Na_2CO_3$ and from 0.5 wt.-% to 5 wt.-% $CaF_2$, in each case based on the weight of the starting material.

9. The process as recited in claim 8, wherein the mixture is from 1 wt.-% to 1.5 wt.-% $Na_2CO_3$ and from 1 wt.-% to 1.5 wt.-% $CaF_2$, in each case based on the weight of the starting material.

10. The process as recited in claim 1, further comprising at least partially recovering the mineralizing agent from the dicalcium silicate product.

11. The process as recited in claim 10, wherein the recovering of the mineralizing agent from the dicalcium silicate product is performed by:
suspending the dicalcium silicate product comprising an alkali metal compound in water so that the alkali-metal compound decomposes to form an alkali metal hydroxide;

adding $CO_2$ to convert the alkali metal hydroxide into at least one of a carbonate and a hydrogen carbonate; and separating off the at least one of a carbonate and a hydrogen-carbonate.

\* \* \* \* \*